United States Patent [19]

Nayar

[11] Patent Number: 4,949,579
[45] Date of Patent: Aug. 21, 1990

[54] APPARATUS FOR GRIPPING HIGH DENSITY DISK PACKS FOR PRECISION BALANCING

[75] Inventor: Sham S. Nayar, Eagan, Minn.

[73] Assignee: Magnetic Peripherals Inc., Minnetonka, Minn.

[21] Appl. No.: 297,213

[22] Filed: Jan. 17, 1989

[51] Int. Cl.⁵ .............................................. G01M 1/02
[52] U.S. Cl. ...................................... 73/468; 73/475; 73/487; 269/32; 269/157
[58] Field of Search ................. 73/468, 471, 472, 473, 73/474, 475, 476, 477, 478, 479, 487; 269/27, 32, 156, 157; 360/98.08, 99.05, 99.12

[56] References Cited

U.S. PATENT DOCUMENTS

| | | | |
|---|---|---|---|
| 884,548 | 4/1908 | Warwick | 269/32 |
| 1,060,477 | 4/1913 | Meyers | 269/157 |
| 1,761,945 | 6/1930 | Van Degrift | 73/477 |
| 2,565,965 | 8/1951 | Hartmann | 269/157 |
| 2,788,686 | 4/1957 | Holt | 269/156 |
| 3,817,088 | 6/1974 | Herbig | 73/468 |

Primary Examiner—John Chapman
Attorney, Agent, or Firm—Edward P. Heller, III

[57] ABSTRACT

A balancing apparatus for balancing a high precision magnetic disk drive includes a plate having a circular aperture in which three mounting surfaces grip a precision mounting ring on the disk pack to be balanced. The plate is mounted on a pivoting platform so that the pack can be lowered into the aperture, gripped by the mounting surfaces and then flipped into a horizontal position for balancing such that an operator has access to the disk pack to add balancing weights through the circular aperture.

5 Claims, 4 Drawing Sheets

APPARATUS FOR GRIPPING HIGH DENSITY DISK PACKS FOR PRECISION BALANCING

BACKGROUND

This invention relates broadly to the field of precision balancing and particularly to endeavors to balance disk packs for data storage devices with high precision so that the track density available for recording information on such disks will not be adversely affected by imprecise balance.

Along with the ordinary reasons for precision balancing (increased life of bearings, etc.) highly precise balancing is required so that essentially no wobble will exist in the plane of the disk as it spins on its axis during use. The elimination of such a wobble allows for precise writing of servo information on one of the surfaces of one of the disks in the pack. The degree of precision available in writing these tracks on the servo disk is tempered by the fact that the axis of the disk pack may wobble, thus creating the need for tolerance in spacing of the servo tracks. In other words, if a servo track is written at one end of the disk pack and it has a substantial wobble as it spins about its axis, the disk on the other end of the pack will have tracks that are located somewhere in a cone of tolerance determined by the degree of wobble. Since the head on the servo track will be lined up exactly with the head on the data track which is wobbling, the head over the data track may be reading an adjacent track by mistake. To accommodate the physical problems involved with failure to achieve a perfect balance, tolerances are built into rotating disk data storage systems so that the data head will always read the data track indicated by the servo head following the servo track.

By use of the invention described herein, a track density of substantially more than 1300 tracks per inch is achievable using 8-inch diameter platters.

Earlier attempts to balance disk packs have centered on the use of an air collet. The collet employs a double acting air cylinder and a three-piece ring gripper to hold the "high precision ring" at one end of the disk pack. This ring is used to mount the disk pack into the finished disk drive data storage product). Due to the heavy weight of the collet, balancing was imprecise. Another problem with the collet is that balancing weights cannot be placed in the internal area of the disk near the "high precision ring" while the collet surrounds the ring. Numerous other mechanical difficulties are faced in using an air collet for balancing, not the least of which is the difficulty with which a worker must load the disk pack onto the collet fixture. Since this had to be done with the disks' planes oriented normal to the ground, the heavy disk pack having numerous 8-inch disks needed to be held in balance in that position for loading into the collet. The worker had to use two hands at all times. Because of the weight and size of the collet fixture, and the relatively small width high precision ring the collet held, loading disk packs with their planes horizontal to the earth and flipping the collet-disk pack assembly was also fraught with problems. Further, in a Class A clean room environment, nearly any metal-to-metal contact generates particulate contamination. Available air collets are typically metal. Further, the collets required tightening and loosening of bolts, another source of particulate generation.

Note that to keep particulate debris from contaminating the disk surface, disk packs are built with the motor and spindle internal to the disk. The balancing ring which holds the balance weights is also internal. In this way, when the disk pack is fixed within the disk drive product, the motor and the balancing weights are completely sealed off from the ambient air that reaches disk surfaces.

SUMMARY OF THE INVENTION

The invention consists of an apparatus for holding a disk pack during balancing.

The holding apparatus includes a fixture having, in the preferred embodiment, three gripping surfaces which, when in place, are mated to firmly engage the outer circumference of the high precision ring at the base of the disk pack. This is accomplished by actuating one of the gripping surfaces which is a surface of a pusher tool that is normally held at a location distal to the circumference of the high precision ring. An actuation means is described for the preferred embodiment to push the pusher into place and provide approximately 250 pounds of pressure on the high precision ring.

The disk pack is loaded in a horizontal position and flipped over so that the disks are in a vertical position for balancing.

In the flipped position, the holding apparatus engages a vibration sensor, which is the preferred embodiment is a split "V" balance weight transmission means. The split "V" transmission means engages the holding apparatus firmly so that the off balance forces generated by the rotating disk drive are transmitted properly into the sensing areas of the balancer.

With the disk planes flipped into the vertical position, access to the balancing ring onto which the balancing weights will be placed is available through the holding fixture. The motor of the drive is used to spin the disks. The sensing mechanisms, in coordination with measurement of rotational velocity of the disk pack, generate information through the balancer indicative of where the balance weight(s) should be placed. Through an iterative process the operator will add balance weights to the balance ring of the disk pack until the highest possible precision balance is achieved. The holding fixture will then be flipped back so that the disk pack disks are aligned in the horizontal plane for removal from the fixtures and further processing to form the finished disk drive product. A high precision balanced disk drive disk pack is thus produced.

DETAILED DESCRIPTION OF THE PREFERRED EMBODIMENT OF THE INVENTION

Figure 1:
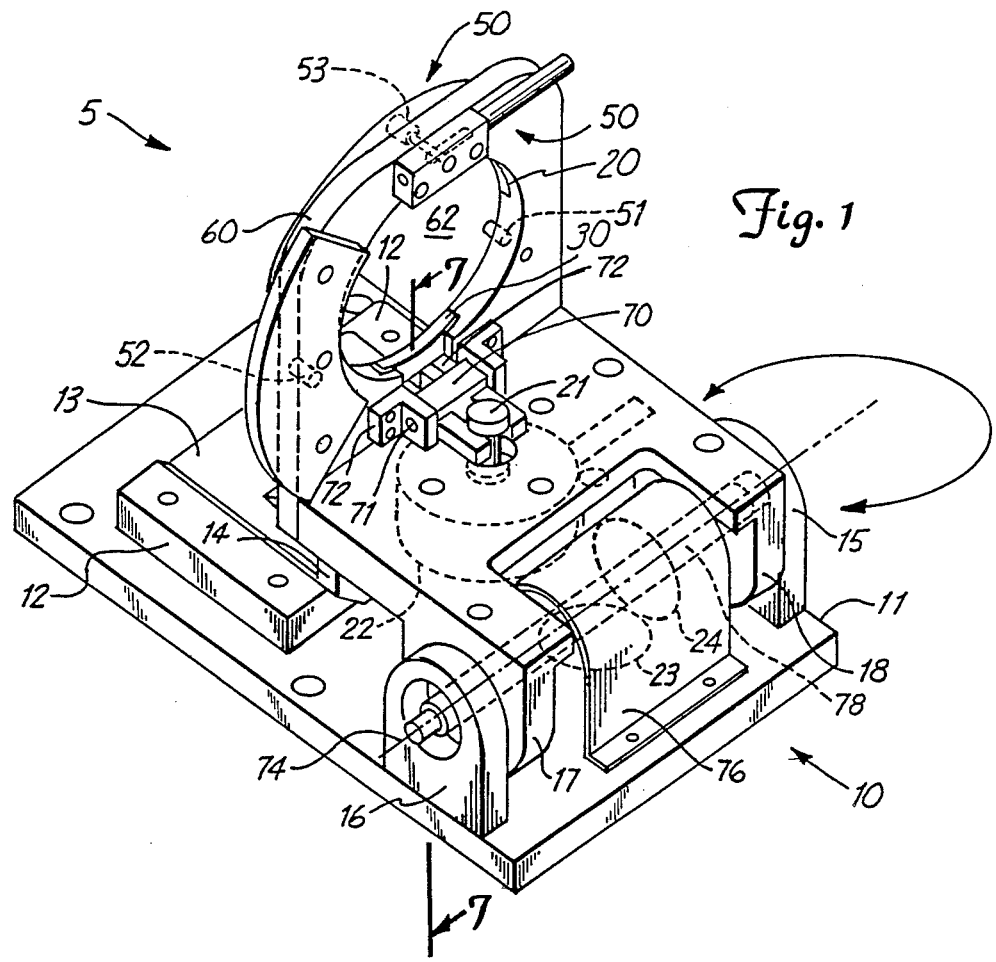
FIG. 1 is a three-dimensional view of the holding tool of the preferred embodiment including details of the pusher, the fail-safe mechansim, and the flipping apparatus.

Referring first to FIG. 1 in which a three-dimensional view of the holding apparatus 10 is shown. Gripping surfaces 20, 30, and 40 (see FIG. 6) will hold the disk pack precision ring when it is engaged.

Figure 5:
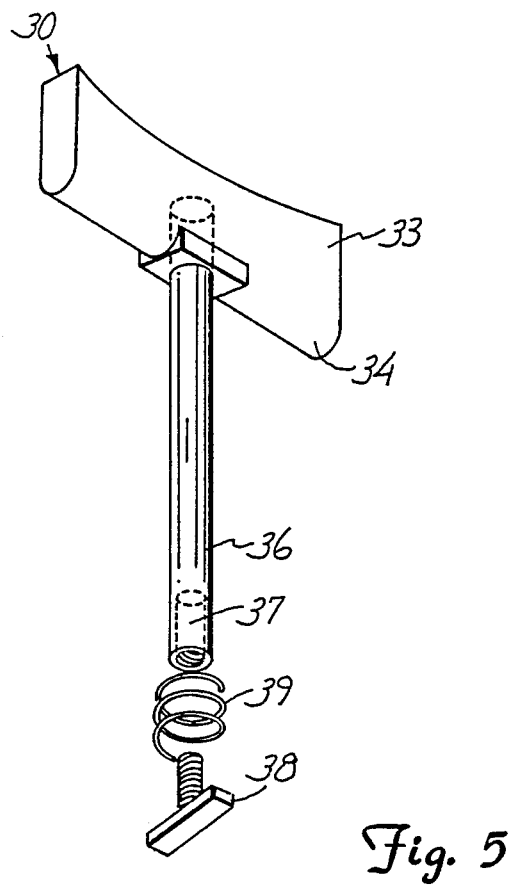
FIG. 5 is an exploded perspective view of the moveable gripper assembly.

The gripping surface 30 is the upper surface of a pusher 31 shown in detail in FIG. 5. These three surfaces in the preferred embodiment make up roughly 155° of the circumference of a circle which measure may be varied, to take advantage of a wider high precision ring or lower weight disk pack, or other well-known factors. While it is possible to use a wider pusher head 33 with a longer surface 30 and only one opposing surface such as a combination of surfaces 40 and 20 (refer back to FIG. 1), good results have been achieved by using these three surfaces located roughly 120 degrees apart from each other, center-to-center. In the preferred embodiment the surfaces 20 and 40 have 55° measurements each and both start(s) at 9° above the horizontal. The pusher head 33 is about 1.893 inches across, giving it slightly more than 55° of arc.

A fail-safe mechanism 50 is seen at the top of the large balancing plate 60. Posts 51 and 52, are seen in dotted outline on the opposite side of the plate 60, work in connection with the engagement member 53 to provide emergency support to the disk pack. In the preferred embodiment (shown), an air actuated rack and pinion mechanism in 50 rotates the member 53 via shaft 53s to engage the high precision ring. If it is not so engaged a fail-safe mechanism prevents the apparatus from being pivoted to the position shown in FIG. 1.

To engage the disk pack precision ring, a puller pin 21 is pulled by double acting air cylinder 22 mounted to the underside of holding plate 61. Actuation of the puller pin 21 toward plate 61 causes the H-shaped pivot member 70 to pivot on its pivot post 71 thus forcing surface 30 toward the center of aperture 62. (Pivot post 71 is mounted to plate 60 by bracket 72.) The whole apparatus 10 rests on a plate 11 to which the sensors are attached. Firmly affixed to or integrally formed with plate 11, split "V" means 12 cradles the mating balance error transfer member 13 connected by extension 14 to plate 61, thus allowing the transfer of the imbalance vibrations into plate 11 for sensing.

Uprights 15 and 16 provide pivot points for rod 74 connecting members 17 and 18 holding plate 61. Gears 23 and 24 provide a mechanism for turning the gear shaft 78 connected to members 18 and 17, thus providing for the flipping movement in the direction of arrow A to move the planes of the disks from horizontal to vertical and vice versa. A cover 76 is provided to cover the gear assembly 24, 23, and 75. Gears are rotated by an air actuated rotary actuator (not shown) under the plate 11.

Figure 2:
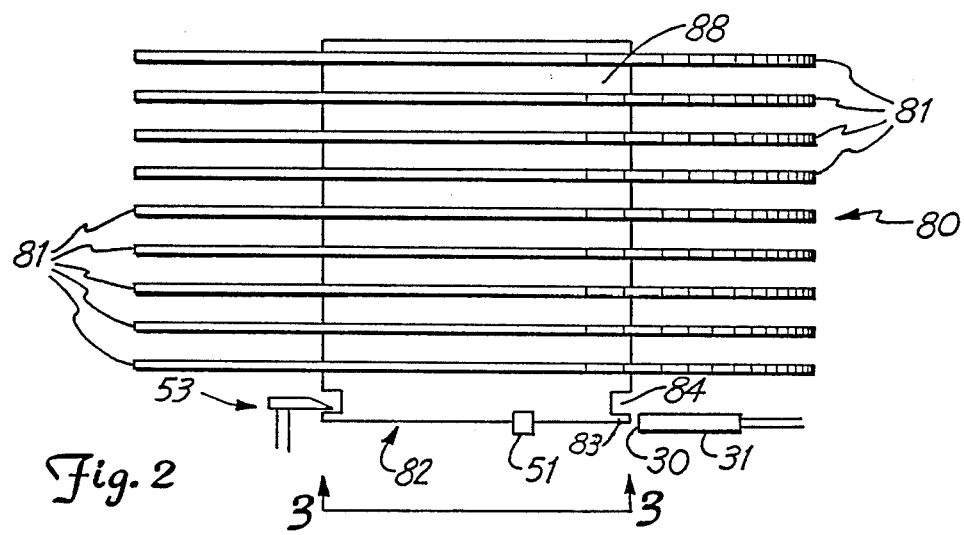
FIG. 2 is a side view of a disk pack.

A side view of the disk pack 80 looking into the plane of the disks 81 is provided in FIG. 2 to show the relationship between the base of the disk pack 82 and the features of this invention. Emergency engagement member 53, holding post 51 and moveable gripper assembly 31 are also shown, without the rest of the holding apparatus 10 of FIG. 1. The high precision ring 83 of the disk pack is shown. The ring includes a clearance 84 between the lower disk and flange 89 above the high precision ring 83 into which the engagement member 53 swings in order to provide emergency holding of the disk pack in conjunction with post 51 and post 52 (not shown). Actual engagement of the ring during normal balancing by items 51, 52 and 53 is not preferred since this may adversely affect balance measurement.

Moveable gripper assembly 31 is shown in distanced space relation to high precision ring 86. Ring 83 is the only part of the disk pack which mechanically positions the pack when mounting it in a disk drive deck. A cable (not shown) supplies power to the motor through an opening in the bottom 82 of spindle casing 88. The details of the connection between the high precision ring assembly 89 and the spindle casing 88 are not shown since it is not relevant to this invention. It is sufficient to note that the high precision ring 83 and a part of the associated assembly 89 spins freely vis-a-vis the remainder of the disk pack 80.

Figure 3:
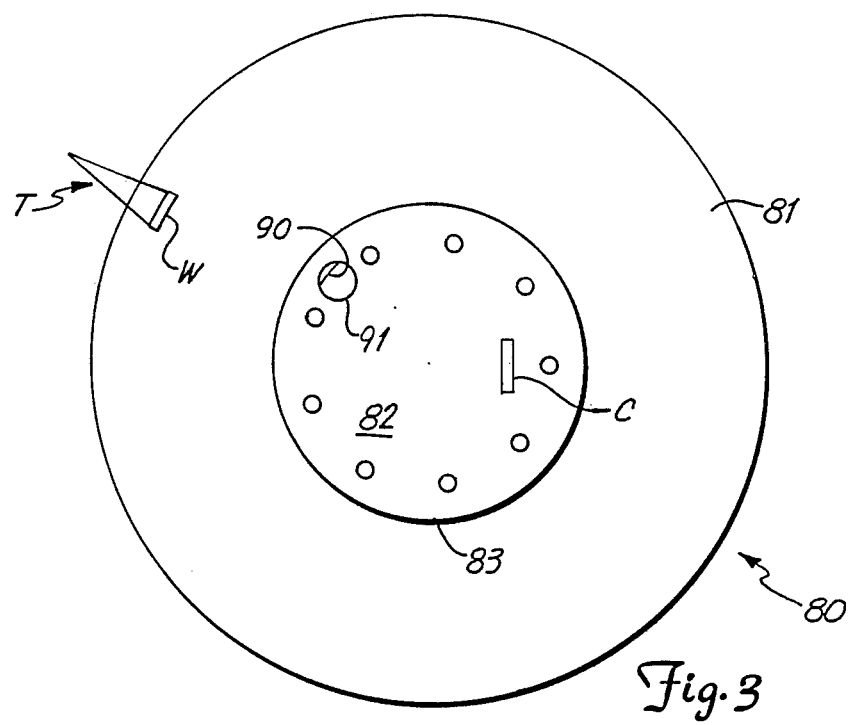
FIG. 3 is a bottom view of a disk pack.

Referring now to FIG. 3, a bottom view of disk pack 80, the bottom 82 and precision ring 83 rotate freely of the disk pack 80, the disks 81, and the balance ring 90. An aperture 91 is available in bottom 82 so that weight W may be manually connected to balance ring 90 by an operator using tweezer T. The cable aperture C, in bottom 82, is also shown. On the opposite end of the disk pack from bottom 82, a similar internal ring and aperture arrangement may be provided or the weights may be placed onto an exposed aperture wall if desired.

Figure 4:
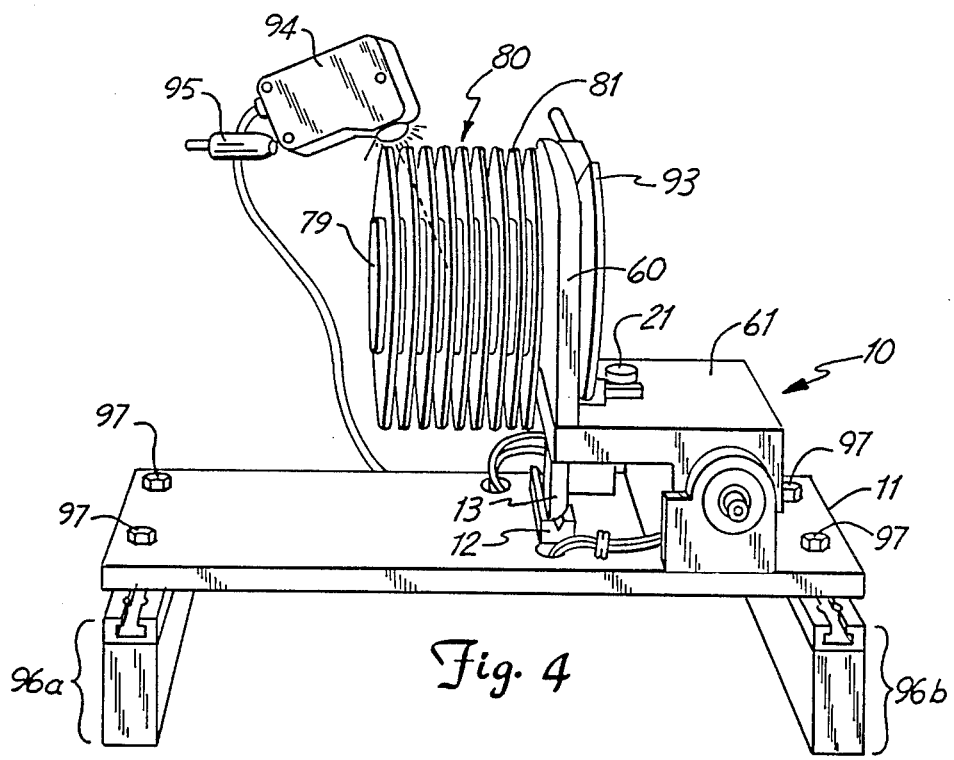
FIG. 4 is a perspective view of a disk pack held by the gripper as during balancing.

Referring now to FIG. 4, the apparatus 10 is shown having the disk pack 80 mounted to holding plate 60 in a relationship for the actual balancing activity. When balancing, vibrations sensors are mounted in two fixed vibrational transfer members 96a and 96b.

The embodiments shown in FIG. 4 is an alternative embodiment to that shown in FIG. 1. However, the same numerals are used for corresponding features. Note that a vibration transfer member 13 with a rounded bottom is used in this embodiment, mating with a smaller "V" member 12 and that these are mounted somewhat distant from support 96a. It is believed that in the FIG. 1 embodiment transfer member 13 and "V" 12 mounted on a shorter vibration sensor plate 11 and having a corresponding support member 96a closer to the "V" 12, provides for better and more accurate transfer of vibrational information through the transfer means into the sensor in support member 96a. Nevertheless, an alternate embodiment is shown in FIG. 4 for completeness. As shown, a mounting assembly 95 holds a light sensing element 94 which counts the occurrences of a mark in the outside upper surface 79 of the disk pack 80. This gives the balance measuring electronic apparatus (not shown) an accurate measure of revolutions per minute. Other means, such as Hall-effect sensors may be used to find the productions per minute of the spinning disks.

A plexiglass or clear plastic guard 93 is also shown mounted to the back of plate 60. This guard is useful for preventing accidental handling of the disks 81.

Referring now to FIG. 5, the pusher assembly 31 (of the apparatus 10 of FIG. 1) is shown. Upper surface 30 is formed to have a curve the same as or just slight larger than high pecision ring 83 of disk pack 80. The surface is formed as part of head 33. Head 33's opposite surface is a curve 34 and a centrally located rectangular box 35. A shaft 36 is mounted into box 35 in a hole therein, said shaft 36 as having an aperture 37 at its opposite end, for threaded mating engagement with cap 38. Cap 38 is designed to hold a spring 39 around shaft 36 when mounted in holding plate 60. Spring 39 forces surface 30 away from the center of aperture 62 (shown in the middle of plate 60 in FIG. 1) when no other forces are at work.

Figure 7:
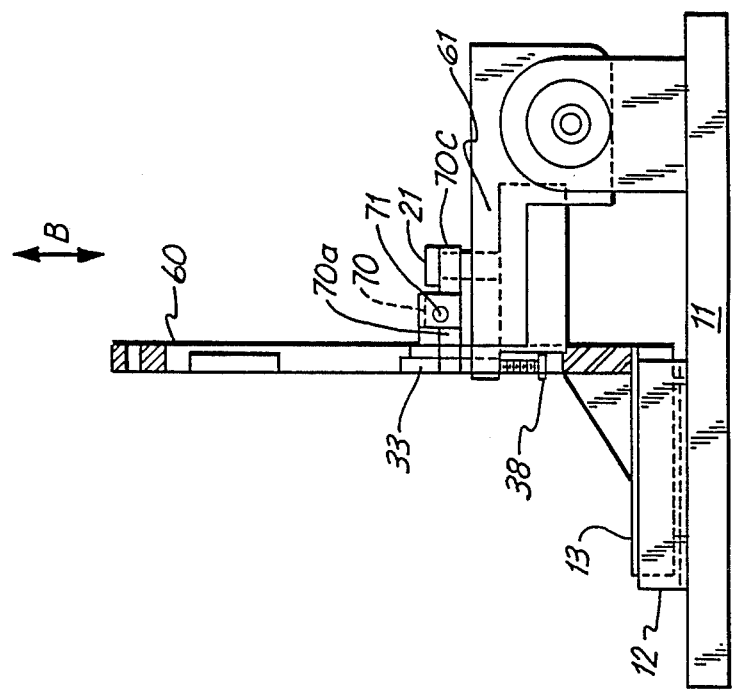
FIG. 7 is a side view of the pusher assembly of FIG. 6.
Figure 6:
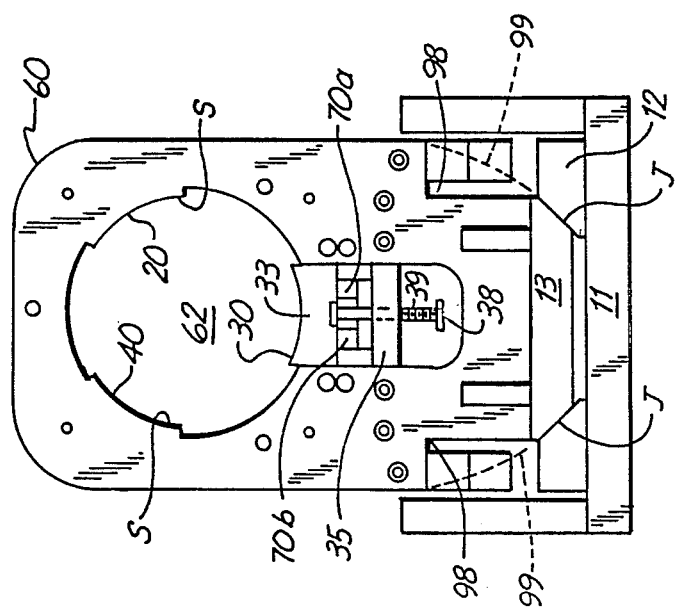
FIG. 6 is a view of the holding assembly taken from point 6 of FIG. 1, sans the emergency holding fail safe mechanism of FIG. 1.

Referring now to FIGS. 6 and 7, some more detail about apparatus 10 may be seen. H uprights 70a and 70b are used to provide inward movement of surface 30 by their association with head 33. This is accomplished by the downward movement of pin 21 against lower H member 70c and 70d (70d not shown) forcing upright 70a and 70b upward because of the pivoting movement of H-shaped member 70 across pivot 71. Pin 21 moves in the direction indicated by arrow B on FIG. 7. When pin 21 moves upwardly, spring 39 forces cap member 38 to pull shaft 36 and thus head 33 downward, and outward from the center of aperture 62. Other means for effecting this travel of the head surface may also be used.

With the details of the structure having been described, some details of the functioning thereof may now be added.

In the preferred embodiment, the sensors and balancer meter used is one designated as CAB690 by SCHENK A.G. of West Germany, and the rpm measurement device is a P51-3 optical pulse meter also from SCHENK, although any balancer and rpm meter which can provide for balancing in two planes of 0.25 gram inches would be sufficient.

Figure 8:
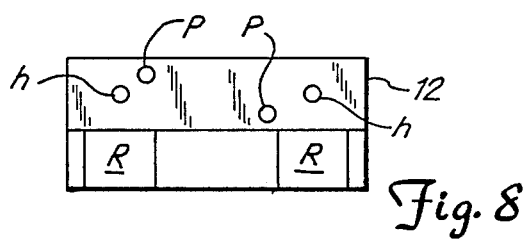
FIG. 8 is a top view of one side of the split V structure.

In the preferred embodiment the plate 60 ought to be a unitary piece of metal, and if practical, the base and transfer member 13 might also be part of that same piece of metal. A structural change in plate 60 which would eliminate the corners 98 would remove a possible source of vibrational error. At the juncture J between the transfer member 13 and the V member 12, a very firm connection must be made. In the preferred embodiment described in FIGS. 1, 6 and 7, the surfaces of the V member at the juncture are mostly recessed, leaving two slightly raised areas so that any minor errors in alignment will not produce a bad juncture. In the alternative embodiment shown in FIG. 4, member 13 has a rounded shaped for mating with the V shape of the V member 12. Small raised areas may also be provided for embodiments of this rounded design. It should be noted that the direction of the V shape does not matter, what is important is that a three point locking is achieved. In FIG. 8, the raised areas are designated by R. In the preferred embodiment each side of the split V 12 are held down by bolts through holes h, and after the mating transfer member 13 is forcibly held on the split V and seating found to be satisfactory the bolts are tightened and holes p are drilled. Into holes p, tight fitting pins are placed to assure that the V is firmly fixed.

In the preferred embodiment the three surfaces 20, 30 and 40 provide for a gripper that has the same diameter, or up to plus 0.001 of an inch of the high precision ring and provided for three point contact. The H member 70 in the preferred embodiment should extend surface 30 into this diameter at the perpendicular (i.e., with the uprights and legs of the "H" 70a, 70b, 70c and 70d, all in the same perpendicular plane) so as to avoid extreme force vectors. The spring 39 will hold surface 30 away from the diameter a few thousandths of an inch until the gripper action is desired. When the spring holds surface 30 away, the H member will of course have also moved away from the said diameter. Further, the head 33 should be somewhat loose in its aperture to allow automatic alignment. A clearance of 0.500 of an inch, approximatelty, is appropriate.

In operation, emergency holding member 53 (FIG. 1) may operate as a rack and pinion device operated by a single acting air cylinder with spring reverse movement when not pressurized. Whichever way this fail-safe device is constructed, it would be sensible to provide that the disk pack may not be moved to a vertical position without this fail-safe device being in place. A supplemental fail-safe device may easily be provided where proximity sensors are mounted behind each surface member at the location of the high precision ring. Use of this supplemental fail-safe contemplates a switch in series with the circuit that activates the movement of the large plate from the mounting position (horizontal) to the balancing position (vertical, see FIGS. 1 and 4).

What is claimed is:

1. Apparatus for holding an assembly during balancing, the assembly having a precision balancing ring, by the application of pressure inward upon the outside circumference of said ring, wherein said apparatus comprises:

a pivotally mounted holding plate member, pivotable between vertical and horizontal positions;

a large plate member perpendicularly mounted on said holding plate member, said large plate member having a circular aperture for receiving an assembly to be balanced and a cavity extending outwardly from said aperture in the plane of said aperture;

three arched surface members arranged around said circular aperture at roughly 120 degrees from each nearest surface member, the inner circumference of said three surface members being nearly exactly matable to the outside circumferencce of the balancing ring of an assembly to be balanced, and wherein one of said surface members is moveable toward and away from said ring, the other two surface members being fixedly mounted on said large plate member;

means for pushing said movable surface member toward the center of said aperture with sufficient force to grip the balancing ring between said three surface members;

vibration sensor means fixedly mounted relative to said holding plate and located such that it is in contact with said large plate when said holding plate is in said horizontal position and said large plate is in a vertical position;

whereby said assembly may be lowered into said aperture and gripped by said three surface members said holding plate member is in a vertical position and said large plate is in a horizontal position, and thereafter said assembly may be pivoted into a horizontal position for balancing with said large plate in contact with said vibration sensor means, the aperture providing easy access to said assembly for the purpose of adding balancing weights.

2. Apparatus according to claim 1 wherein said means for pushing said movable surface member include a shaft mounted on said large plate member within said cavity and connected to the movable one of said surface members, the combination forming a head slidably mounted in said cavity;

means for biasing said head away from the center of said aperture;

a pivot member having two ends, a pusher end of the pivot member in abutting arrangement with said head;

a puller engaging the other end of said pivot member; and actuation means for moving said puller pin in two directions, the direction of movement arranged such that movement of said puller pin in one direction causes said pivot member pusher end to push against said head in a direction toward the center of said circular aperture.

3. The apparatus of claim 2 wherein said pivot member is H-shaped having two upright members comprising said pusher end, two base members comprising said other end, and a cross member comprising a pivot.

4. The apparatus of claim 3 wherein said puller pin includes a spread member engaging said two base members.

5. The apparatus of claim 2 wherein the axis of movement of said puller pin is parallel with the axis of movement of said head.

* * * * *